United States Patent [19]

Moore

[11] Patent Number: 4,697,818
[45] Date of Patent: Oct. 6, 1987

[54] QUICK CHANGE TOWING HITCH

[76] Inventor: Gary W. Moore, 6503 Brittany Park La., Houston, Tex. 77066

[21] Appl. No.: 803,511

[22] Filed: Nov. 29, 1985

Related U.S. Application Data

[62] Division of Ser. No. 623,571, Jun. 22, 1984, abandoned.

[51] Int. Cl.⁴ .............................................. B60D 1/06
[52] U.S. Cl. ................................. 280/415 A; 280/505
[58] Field of Search ............... 280/415 R, 415 A, 417, 280/491 R, 491 A, 495, 498, 500, 502, 504, 505, 506, 511

[56] References Cited

U.S. PATENT DOCUMENTS

| | | | |
|---|---|---|---|
| 2,872,213 | 2/1959 | Hosford | 280/415 |
| 2,929,643 | 3/1960 | Merchant | 280/491 A |
| 3,801,134 | 4/1974 | Dees | 280/415 A |
| 3,806,161 | 4/1974 | Pollart et al. | 280/500 |
| 3,922,006 | 11/1975 | Borges | 280/415 A |
| 4,022,490 | 5/1977 | Rocksvold | 280/500 |
| 4,050,714 | 9/1977 | Epp | 280/495 |
| 4,157,189 | 6/1979 | Poley | 280/500 |
| 4,202,562 | 5/1980 | Sorenson | 280/415 R |
| 4,232,877 | 11/1980 | Milton | 280/415 A |
| 4,248,450 | 2/1981 | McWethy | 280/415 A |
| 4,275,899 | 6/1981 | Humphrey | 280/500 |
| 4,280,713 | 7/1981 | Bruhn | 280/415 A |
| 4,317,580 | 3/1982 | Scarnato et al. | 280/415 R |
| 4,456,279 | 6/1984 | Dirck | 280/500 |

Primary Examiner—John J. Love
Assistant Examiner—Charles R. Watts
Attorney, Agent, or Firm—Harvey B. Jacobson; Clarence A. O'Brien

[57] ABSTRACT

A quick change towing hitch attaches directly to existing, standard towing ball ports on a towing vehicle without the need for special adaptors. The hitch furnishes a pair of differently sized tow balls which can be quickly indexed into position, as needed, without the use of tools.

2 Claims, 12 Drawing Figures

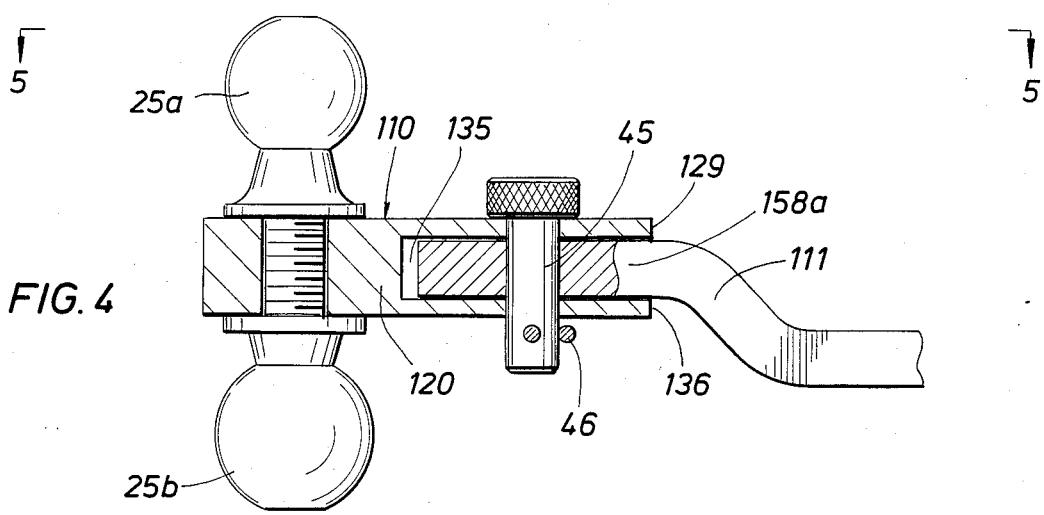
FIG. 4
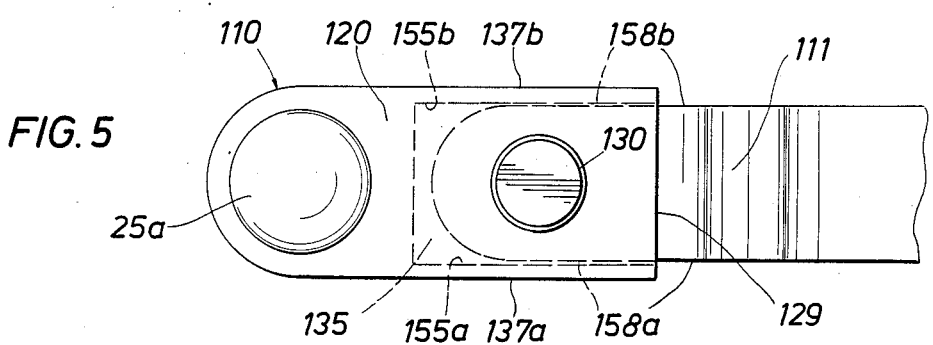
FIG. 5
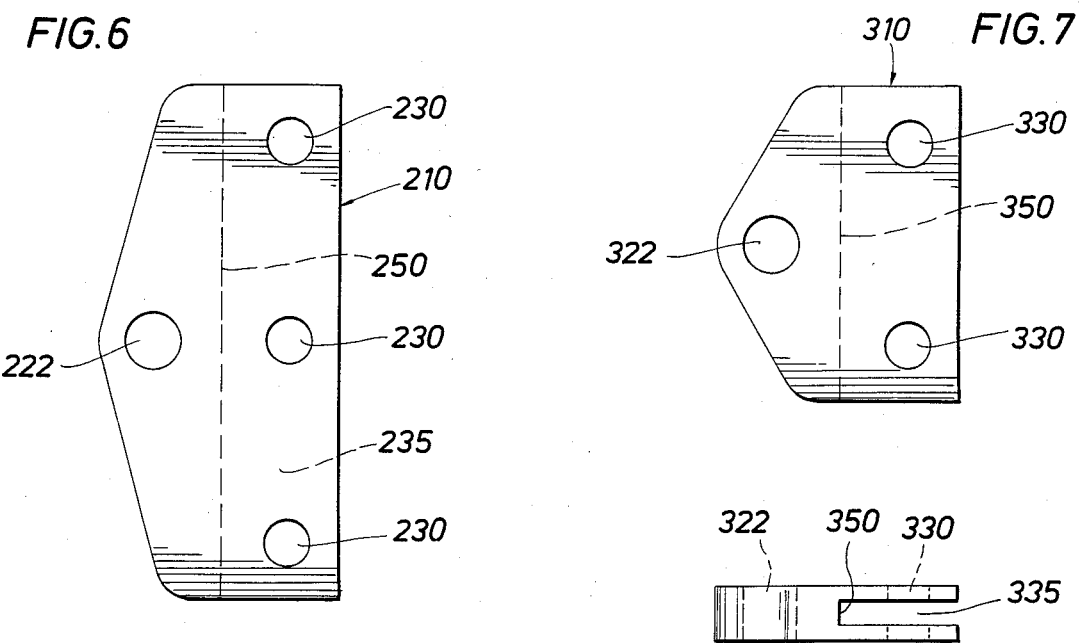
FIG. 6
FIG. 7
FIG. 8

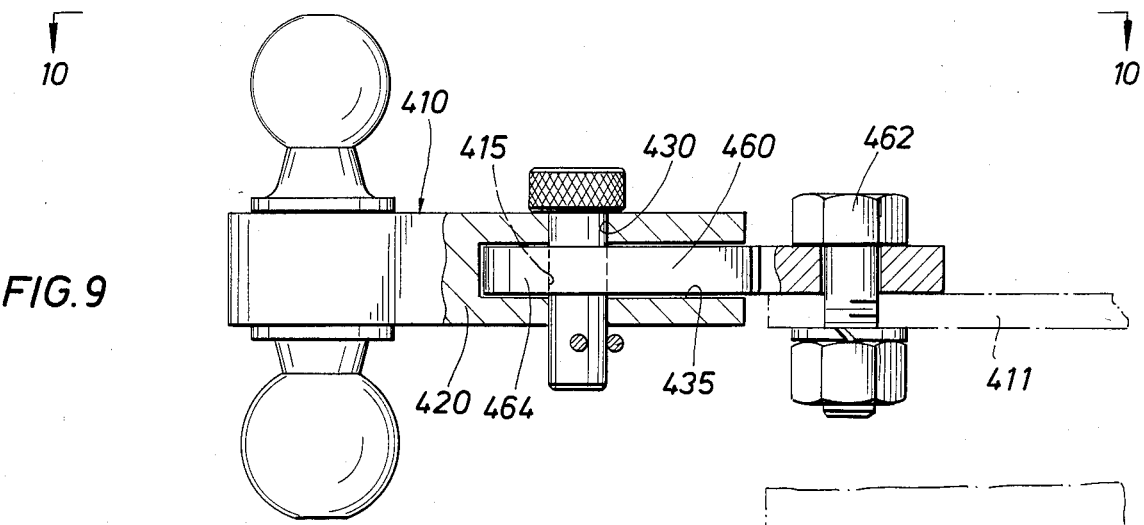
FIG. 9
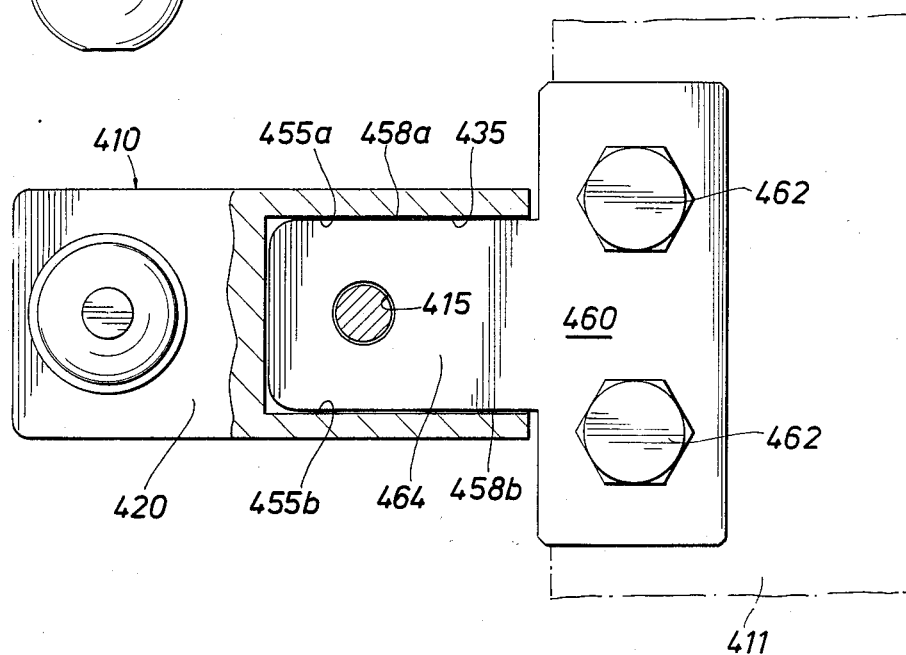
FIG. 10
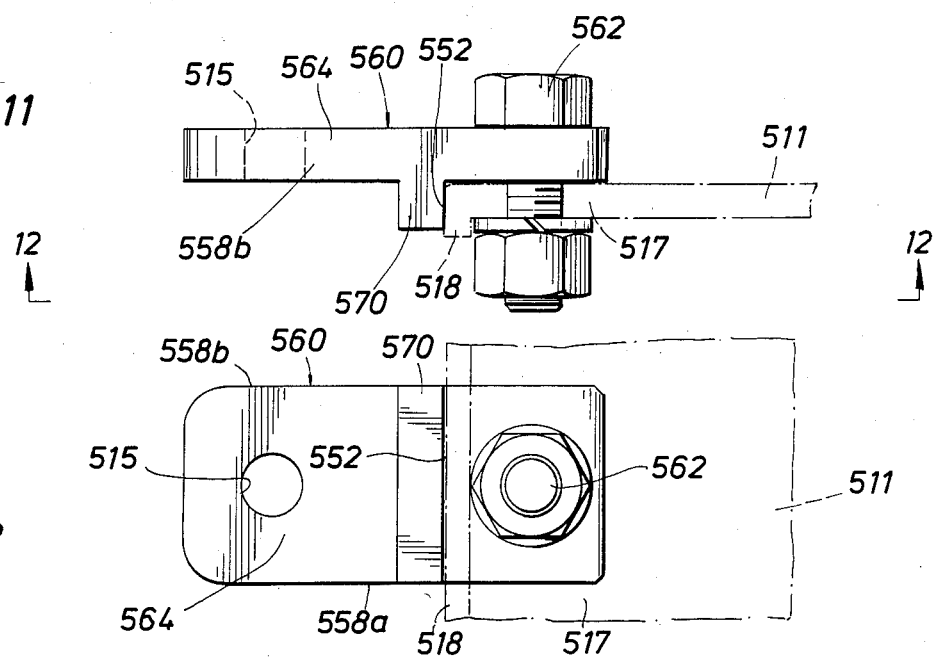
FIG. 11
FIG. 12

QUICK CHANGE TOWING HITCH

This application is a division of application Ser. No. 623,571, filed June 22, 1984, now abandoned.

BACKGROUND OF THE INVENTION

The present invention relates to towing hitches, and more particularly to a vehicular towing hitch which can be readily attached directly to an existing, standard towing hitch without the need for special adaptors, and which provides for quickly and easily changing tow ball sizes, as desired, without the need for tools.

Conventional towing hitches, often referred to as trailer hitches, most often are of the tow ball hitch type in which a tow ball extends upwardly from a mount at the rear of the towing vehicle. Such ball hitches are almost universally limited to a single ball size. In many circumstances, however, the user wishes to tow more than one type and size of vehicle. When the tow socket sizes on the towed vehicles vary in size, it then becomes necessary for the user to manually remove the currently installed tow ball and install a tow ball of the proper size for mating with the alternately towed vehicle. This not only requires tools, but it is also time consuming, inconvenient, cumbersome, and often may damage the tow balls. To many users, therefore, current towing hitches are very inconvenient, if not very irritating.

The prior art includes a number of towing hitch designs and configurations which provide for more conveniently changing tow ball sizes. However, these prior art devices, generally speaking, are not only rather complicated, but they also usually require special adaptors or installation procedures to attach them to the vehicle. This makes them more expensive than necessary, not only from a manufacturing standpoint (more parts imply more cost), but also because of the additional installation costs to the ultimate user, who often already has a standard towing hitch, or factory provisions for one, on his vehicle.

A need therefore remains for a quick change towing hitch which can quickly and easily index the desired size of tow ball into position, which can do so without the need for or use of tools, which is inexpensive, uncomplicated, versatile, especially convenient and easy to use, and which may be readily attached directly to an existing, standard towing hitch or towing hitch mount on a vehicle without the need for a special adaptor.

SUMMARY OF THE INVENTION

Briefly, the present invention meets the above needs and purposes with a quick change towing hitch designed for easy attachment directly to an existing, standard towing hitch on a vehicle. The preferred embodiment is particularly designed for attachment to such a standard towing hitch having a ball port therein for receiving a towing ball, although provision is also made, by means of an adaptor, for coupling to a vehicle lacking a functional standard towing hitch.

In the preferred embodiment, the towing hitch includes a body member having a ball opening passing therethrough at the rearward end thereof for receiving a pair of differently sized tow balls oppositely mounted thereon, and supported through the ball opening. At the forward end of the body member there is a retainer pin opening which passes through the body member substantially parallel to the ball opening which is opposite it at the rearward end of the body member.

On and within the forward end of the body member is a horizontal slot which is sized to slip onto a standard hitch on the vehicle. In part because of the symmetry of the invention, it may be received on the standard hitch in either of two reversed positions. Thus, expressed another way, the slot within the body member reversibly receives therein at least a portion of the vehicle's standard hitch when it is advanced onto the standard hitch.

The slot is sized so that the body member may be advanced onto the standard hitch up to at least an "installed position". The installed position is defined as that position wherein the retainer pin opening is aligned with the tow ball port on the standard hitch. Further, the slot is preferably kept narrow enough so that it engages the standard hitch for vertically supporting the body member thereon. This engagement also prevents both vertical movement and vertical rotation of the body member with respect to the standard hitch when the body member is in the installed position. (The term "vertical rotation", as used herein, refers to rotation around a horizontal axis, such that at least a portion of the body member is displaced vertically. Likewise, the term "horizontal rotation", as used herein, refers to rotation around a vertical axis, such that at least a portion of the body member is displaced horizontally.)

For conveniently securing the body member onto the vehicle hitch, and later releasing and removing it as desired, all without the use of tools, the invention includes a retainer pin which is sized for passing through the retainer pin opening in the body member and through the corresponding ball port when they are aligned with one another. This holds the retainer opening in alignment with the ball port, locking the body member onto the vehicle hitch. A manually operable locking means, preferably a clevis pin, is then used to lock the retainer pin without the retainer pin opening and the ball port.

To prevent the body member from rotating horizontally about the retainer pin opening when in the installed position (and with the retainer pin installed in the retainer pin opening and the ball port), the body member has an alignment surface for this purpose. The alignment surface is shaped to engage a corresponding portion of the standard hitch in such a manner that such horizontal rotation is prevented by the close interfitting thereof.

It is therefore an object of the present invention to provide an improved, quick change towing hitch; a quick change towing hitch which may be attached directly to an existing, standard towing hitch on a vehicle; which can be readily attached directly to such a towing hitch without the need for tools or special adaptors; which can support a pair of differently sized tow balls; in which the tow balls can be quickly indexed into towing position, as needed, without the use of tools; which includes a body member having a ball opening passing therethrough at the rearward end thereof for receiving tow balls oppositely mounted thereon and supported therethrough; which also includes a retainer opening passing through the body member at the forward end thereof and substantially parallel to the ball opening; which includes a slot within the body member for reversibly receiving therein at least a portion of the vehicle's standard hitch while advancing the body member onto the standard hitch to an installed position wherein the retainer opening is aligned with the ball port on the standard hitch; in which the slot is sized to engage the standard hitch for vertically supporting the body member thereon and preventing both vertical movement and vertical rotation of the body member with respect to the standard hitch when in the installed position; which includes alignment means on the body member for engagement with the standard hitch when in the installed position to prevent the body member from rotating horizontally about the retainer opening when the latter is held in alignment with the ball port on the standard hitch; and to accomplish the above objects and purposes in a quick change towing hitch which is also inexpensive, uncomplicated, versatile, and especially convenient and easy to use.

Other objects and advantages of the invention will be apparent from the following description, the accompanying drawings and the appended claims.

BRIEF DESCRIPTION OF THE DRAWINGS

FIG. 4 is a cross-sectional view similar to FIG. 2 of another embodiment of the invention designed for attachment to a standard tongue hitch;

FIG. 5 is a top view of the FIG. 4 embodiment taken on view line 5—5 in FIG. 4;

FIG. 6 is a top view of a third embodiment of the invention, similar to that illustrated in FIGS. 1-3, designed for coupling to multiple ball ports in the standard towing hitch on the vehicle;

FIG. 7 is a top view of a fourth embodiment of the invention, similar to that illustrated in FIG. 6, designed for coupling to two ball ports in the standard towing hitch on the vehicle;

FIG. 8 is a side view of FIG. 7 embodiment;

FIG. 9 is side view, partiallly in section, of still another embodiment of the invention, similar to that illustrated in FIGS. 4-5, including an adapter for coupling to a vehicle unable to directly accept a quick change towing hitch;

FIG. 10 is a top view of the FIG. 9 embodiment also partially in section, taken on view line 10—10 therein;

FIG. 11 is a side view of another adapter; and

FIG. 12 is a bottom view of the FIG. 11 adapter, taken on view line 12—12 therein.

DESCRIPTION OF THE PREFERRED EMBODIMENTS

Figure 1:
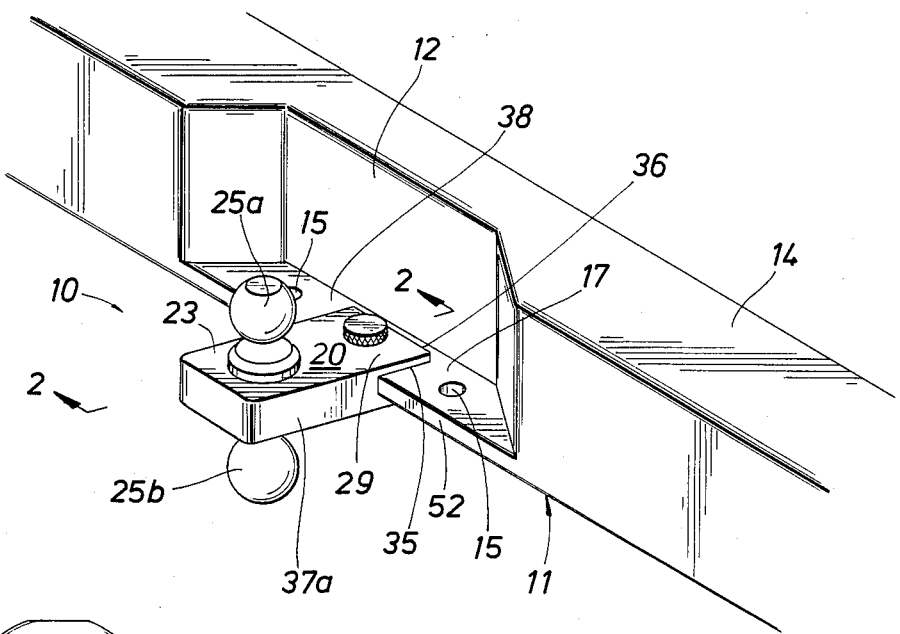
FIG. 1 is a fragmentary, somewhat figurative, perspective illustration showing a preferred embodiment of the invention mounted upon a standard towing hitch in a light truck bumper.

With reference to the drawings, the new and improved quick change towing hitch, for attachment directly to an existing, standard towing hitch on a vehicle, will be described. FIG. 1 shows a preferred embodiment 10 of the present invention mounted upon a standard towing hitch 11 located in a recess 12 in a light truck bumper 14. Hitch 11 includes several ball ports 15 passing vertically through a horizontal hitch mounting plate 17. The ports 15 are for receiving one or more towing balls therein, in known fashion.

Figure 2:
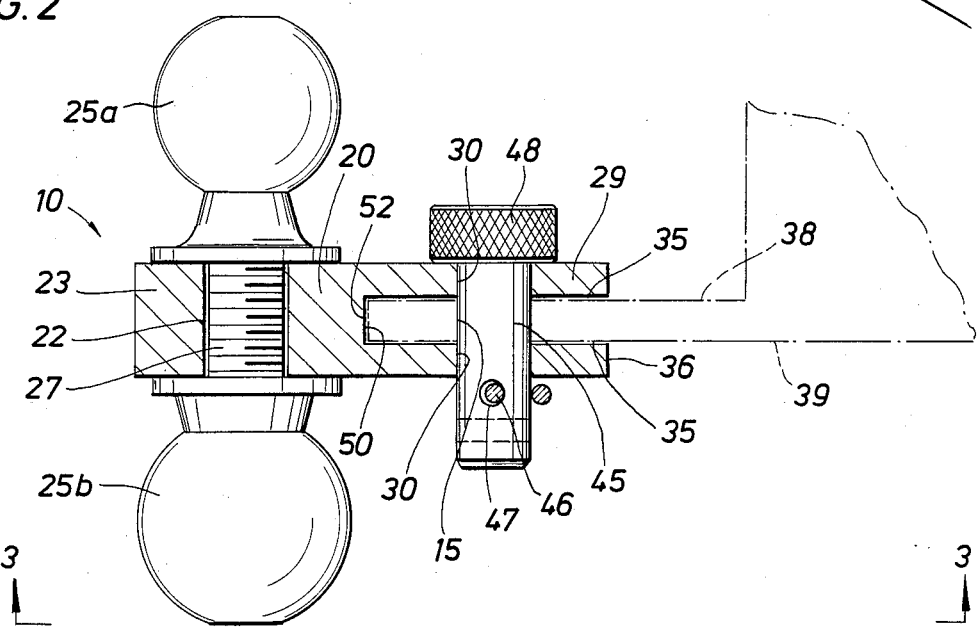
FIG. 2 is a cross-sectional view of the FIG. 1 embodiment taken generally on line 2—2 thereof.
Figure 3:
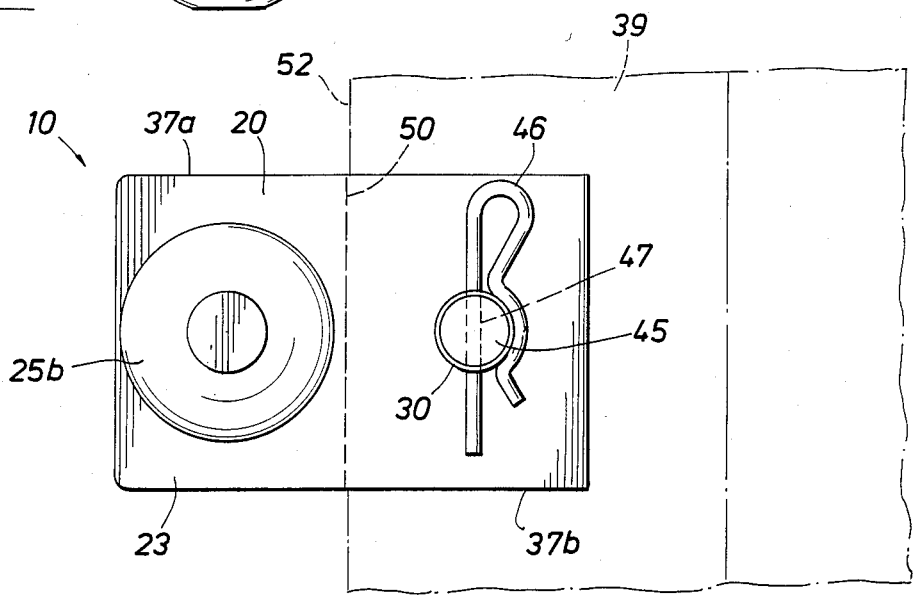
FIG. 3 is a bottom view of the FIG. 1 embodiment taken on view line 3—3 in FIG. 2.

As shown in FIGS. 1-3, the quick change towing hitch 10 includes a body member 20 having a ball opening 22 passing therethrough at the rearward end 23 thereof. A pair of differently sized balls 25a and 25b is received and mounted on opening 22, as by a common threaded stud 27 connecting therethrough (FIG. 2). Common sizes for balls 25a and 25b would be 1⅞" and 2", although other sizes, such as 2 5/16", etc., may be used as desired.

At the forward end 29 of body member 20 is a retainer pin opening 30. Opening 30 passes through body member 20 and, as may be seen in the drawing figures, is substantially parallel to the ball opening 22.

Also located in the forward end 29 of the body member 20 is a slot or recess 35 extending horizontally into body member 20 through the front edge 36 thereof. In embodiment 10, slot 35 actually extends entirely across the forward end 29 of body member 20, and is open through at least the forward ends of the sides 37a and 37b thereof.

Slot 35 is sized to slip onto the towing hitch mounting plate 17 so that it receives plate 17 therein while body member 20 is advanced onto the plate 17 to an installed position. The installed position is that shown in the drawing figures, wherein the retainer pin opening 30 is aligned with one of the ball ports 15 on the plate 17 of the standard towing hitch 11. The slot is sized to engage the standard hitch closely (in this embodiment that means being of a height nearly the same as the thickness of the plate 17), so that body member 20 is vertically supported thereon. As will be clear from the drawings, slot 35 is sufficiently deep, and enough of plate 17 is gripped both on the top 38 and bottom 39 thereof, that body member 20 cannot move vertically or twist or rotate vertically (around a horizontal axis). This assures that the tongue weight of the towed vehicle will be properly supported.

A manually operable retainer pin 45 is used to secure the quick change towing hitch 10 onto the standard towing hitch 11. Pin 45, which is properly sized for passing through the retainer pin opening 30 and its corresponding ball port 15 when they are aligned with one another, is located therethrough as shown in the drawing figures. A clevis pin 46 passes through a hole 47 in retainer pin 45, on the end opposite pin head 48, to lock the retainer pin 45 within the retainer pin opening 30 and ball port 15. Thus body member 20 is secured onto the standard towing hitch 11.

It is also important to prevent body member 20 from rotating horizontally (i.e., on a vertical axis of rotation) about retainer pin 45 and retainer pin opening 30 when the quick change towing hitch 10 is located in its installed position and the retainer pin 45 is installed as illustrated. To accomplish this, body member 20 has an alignment surface 50 which is positioned for engaging an alignment portion 52 of the standard hitch 11. In embodiment 10, alignment surface 50 is a flat surface defining the rearward end on slot 35, which is designed, positioned, and dimensioned to closely engage the rear edge 52 of hitch mounting plate 17, which in this case thus serves as the standard towing hitch alignment portion 52.

To install the invention, it is easily seen that no special adapters are needed. Slot 35 is simply and quickly slipped onto the existing hitch mounting plate 17 with the desired tow ball size 25a or 25b located on top. Opening 30 is aligned with the selected port 15 and the retainer pin 45 is dropped therethrough. The assembly is then secured when clevis pin 46 is installed in known fashion in retainer pin hole 47.

To change the operative size of the tow ball quickly and easily and without tools, the above installation process is reversed. Body member 20 is then inverted (placing the other tow ball on top), and the installation procedure is then repeated. This can be done in just a few seconds.

It is recognized, of course, that there are a number of different "standard" towing hitches. Each, in one way or another provides a clear mounting port at the rear of the towing vehicle so that a standard tow ball may be mounted therein. Accordingly, several additional embodiments of the present invention are illustrated and will now be described to show how the operative principles of the present invention may be easily adapted as needed to many other towing hitch configurations. Since most of the operative portions of these additional embodiments are analogous to the operative parts of embodiment 10, such corresponding parts are similarly numbered, indexed by 100, 200, and so on.

One such common tow hitch variation is shown in FIGS. 4 and 5. Here hitch 111 is a tongue hitch, cantilevered from the rear of the vehicle. Since it contains no laterally extending surface such as alignment portion 52 of hitch mounting plate 17 (FIGS. 1-3), slot 135 in body member 120 is open only through the front edge 136 of the forward end 129 of the body member. The sides 137a and 137b of body member 120 are entirely closed. Then, to prevent the body member 120 from rotating horizontally, the inner side surfaces 155a and 155b of slot 135 serve as the alignment surface for hitch 110. These engage the side surfaces 158a and 158b of tongue hitch 111, surfaces 158a and 158b being the alignment portion of the standard hitch 111.

Similarly, FIG. 6 shows an embodiment 210 having three retainer pin openings 230, and FIGS. 7-8 show an embodiment 310 having two retainer pin openings 330. These are for mounting upon standard hitches, such as hitch 11 (FIGS. 1-3), which have a plurality of ball ports 15. Openings 230 and 330 are spaced, of course, for simultaneous alignment with the ball ports 15 when the hitches 210 and 310 are in their respective installed positions on the vehicle's standard towing hitch.

Hitches 210 and 310 have several advantages. Of course, they offer additional strength and stability since they are physically larger, and several retainer pins may be used simultaneously to secure them to the vehicle's standard towing hitch. Additionally, the several retainer pins themselves will prevent horizontal rotation of the hitches 210 and 310 on the vehicle's standard towing hitch, so that the plural openings 230 and 330, along with the pins 45, function as the alignment means to prevent such horizontal rotation. Therefore, the rear surfaces 250 and 350 of slots 235 and 335, respectively, may or may not be sized and positioned for use as alignment surfaces, according to the application and needs at hand.

Finally, not all existing, standard towing hitches will be shaped to accept a slot, such as slots 35, 135, 235, and 335. Sometimes a hitch mounting plate 17 will be damaged (bent) so that the slot cannot fit onto it. Some hitch mounting plates, such as plate 517 (FIGS. 11 and 12), have a lip 518 extending downwardly from the rear edge thereof, preventing the slot from properly engaging the plate even if the slot is large enough to slip over the lip. In this case an adapter is provided for use with the present invention. The adapter attaches directly to the existing standard towing hitch on the vehicle and provides a new towing hitch having a ball port onto which a regular tow ball could be attached, if desired. Of course, the present invention, such as quick change hitch 410 (FIGS. 9 and 10), is installed instead.

FIGS. 9-12 illustrate two such adapters 460 and 560, both of which are preferably bolted with bolts 462 and 562 onto their corresponding existing hitches 411 and 511, since the latter are engaged only on one surface (illustrated herein as the top surface). Bolting is therefore recommended since it provides the additional strength needed to secure the adapters against being moved vertically, under load, relative to the hitches 411 and 511.

Adapters 460 and 560, in the preferred embodiments, are both plates which are sized at their rearward portions 464 and 564 to receive the quick change towing hitch slot 435 in its installed position thereon. The rearward portions 464 and 564 thus engage the towing hitch body member 420, support it, and prevent both vertical movement and vertical rotation of the body member with respect thereto.

Similarly to towing hitch 110 (FIGS. 4-5), hitch 410 employs slot sides 455a and 455b as the body member alignment surfaces, for engaging the sides 458a and 458b, or 558a and 558b, respectively, of the rearward portions 464 and 564 of the adapters 460 and 560. This prevents the body member 420 from rotating horizontally about the retainer pin opening 430 and 530 when held in alignment with the corresponding port 415 and 515.

As shown in FIGS. 9-10, when a pair of bolts 462 is used, adapter plate 460 is rigidly secured onto hitch 411. In FIGS. 11-12, however, it can be seen that adapter plate 560 has only one bolt 562. Therefore a boss 570 is provided thereon located rearwardly of the forward edge 572 thereof. Boss 570 extends vertically for engaging a corresponding vertical surface of the vehicle, such as the rear edge 552 of the lip 518 of the hitch mounting plate 517. This prevents horizontal rotation of the adapter plate 560.

As may be seen, therefore, the present invention provides numerous advantages. It is extremely easy to install. It can, with relatively few embodiments, be used with virtually any existing, standard towing hitch. As easily and quickly as it can be installed, it can be reversed to index a differently sized ball into towing position, as needed or desired. All this can be done without the need for or use of tools. Unlike prior art devices, the present invention can be used in most cases without the need for a special adapter. Where an adapter is required, it is not required as an inherent result of the present invention, since the selfsame invention can be readily mounted on most other existing hitches without an adapter. Such cases, rather, are exceptional, resulting from a special hitch condition, and even these are easily and simply accommodated by the present invention. The present invention thus provides an improved, quick change towing hitch which may be readily attached directly to an existing, standard towing hitch on a vehicle without the need for tools or special adaptors, and which can support a pair of differently sized tow balls which can be quickly indexed into towing position, as needed, without the use of tools. In addition, the quick change towing hitch of the present invention is inexpensive, uncomplicated, durable, versatile, rugged, easy to manufacture, and especially convenient and easy to use.

While the methods and forms of apparatus herein described consitute preferred embodiments of this invention, it is to be understood that the invention is not limited to these precise methods and forms of apparatus, and that changes may be made therein without departing from the scope of the invention.

What is claimed is:

1. In combination with a towing vehicle including a hitch ball mounting portion incorporating a vehicle end mounted horizontal support member having spaced apart upper and lower surfaces including rear extremities interconnected by a rearwardly facing upstanding edge surface extending therebetween and wherein said support member includes a rear portion having an upstanding shank receiving opening formed therethrough forward of said edge surface and opening upwardly and downwardly, respectively, through said upper and lower surfaces, a quick change hitch for removable, reversible attachment to said mounting portion, said hitch comprising a horizontally elongated hitch body including front and rear portions, said rear portion including an upstanding ball mounting stud opening formed therethrough, a mounting stud extending and secured through said ball mounting stud opening and having upper and lower ends upon which upwardly and downwardly facing hitch balls, respectively, are mounted, said front portion defining a horizontal forwardly opening recess therein opening outwardly through said front portion, said hitch body being forwardly displaceable, in relatively inverted positions angularly displaced 180° apart about the longitudinal axis of said hitch body, into overlapping engagement with said horizontal support member from the rear thereof and with at least said rear portion of said support member having said shank receiving opening formed therethrough snugly received in and at least substantially seated in said recess, the portions of said front portion of said hitch body defining said recess having a pair of vertically registered retaining pin openings formed therethrough axially registered with said shank receiving opening, a retainer pin removably secured through said shank receiving and retaining pin openings, said recess opening only through the front portion of said hitch body with the sides of said hitch body being closed, said support member comprising a rearwardly projecting adaptor plate removably mounted from and overlap engaged with a horizontal flange portion of a rear mounted bumper on said vehicle.

2. The hitch ball mounting portion and the quick change hitch combination of claim 1 wherein said support member comprises a rearwardly projecting tongue hitch.

* * * * *